United States Patent Office 3,012,988
Patented Dec. 12, 1961

---

3,012,988
PHOSPHORUS-CONTAINING SPIROBI(META-DIOXANE) PHENOLIC RESINS
Howard R. Guest, Charleston, and Ben W. Kiff, Ona, W. Va., assignors to Union Carbide Corporation, a corporation of New York
No Drawing. Filed Aug. 29, 1958, Ser. No. 757,895
16 Claims. (Cl. 260—47)

This invention relates to flame-resistant organic materials derived from 3,9-dialkenylspirobi(meta-dioxane) derivatives. In a particular aspect, this invention relates to resins containing spirobi(meta-dioxane) and phenolic groups, and chemically-bound phosphorus.

Resins formed by the polymerization of spirobi(meta-dioxane) derivatives with phenols have many properties which make them commercially attractive. They are hard and tough and can be made with good clarity and color. However, in common with most other organic plastic materials commercially available, they suffer the disadvantage of being flammable. In many applications, particularly in the structural field, there would be great advantage in having strong, tough, rigid plastics with excellent weatherability characteristics which at the same time were flame-resistant.

A conventional method of reducing the flammability of a plastic is to incorporate mechanically a phosphorus-containing plasticizer into the plastic by milling or other similar operation. Considerable quantities of such plasticizers are required to produce this flame-resistance property in the plastic. Usually the plasticizer modifies other properties of the plastic in a beneficial way at the same time. Plasticizers of this type include compounds such as tricresyl phosphate and trioctyl phosphate.

This method of reducing the flammability of plastics with phosphorus-containing plasticizers is not practical for polymers produced from spirobi(meta-dioxane) derivatives. These polymers are not compatible with many of the phosphorus-containing plasticizers, and when proper compatability between the polymers and plasticizers is accomplished it is found that many of the desirable properties of the polymers are adversely affected. Further, no additive is known which can be mixed mechanically with spirobi(meta-dioxane) polymers to produce non-flammable compositions.

It is a main object of this invention to produce flame-resistant spirobi(meta-dioxane) phenolic polymers. Other objects and advantages of this invention will become apparent to those skilled in the art from the accompanying description and disclosure.

Accordingly, flame-resistant polymers are produced by reacting a mixture of 3,9-dialkenylspirobi(meta-dioxane) and a phenol with pentaerythritol phosphite material of the class produced by hydrolysis of the reaction product derived from the condensation of pentaerythritol with phosphorus trichloride. The polymers so produced contain chemically-bound phosphorus as a substantive part of the polymers.

The pentaerythritol phosphite material employed is a mixture comprising a phosphorus acid ester formed in the following manner:

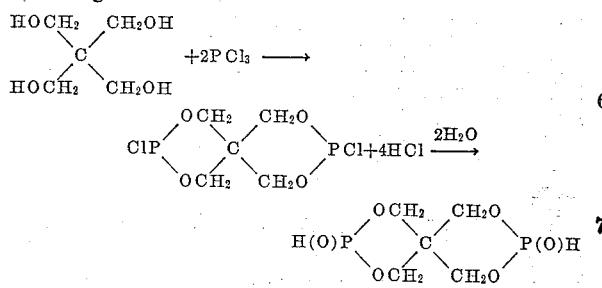

"Pentaerythritol phosphorous acid ester" as used hereinafter refers to the ester mixture obtained by hydrolysis of the reaction product of pentaerythritol with phosphorus trichloride. The ester mixture is acidic and has free hydroxyl groups capable of condensing with unsaturated compounds.

The 3,9 - dialkenylspirobi(meta-dioxane) derivatives contemplated are those having alkenyl substituents in the three-position and in the nine-position, each alkenyl substitutent containing between two and about eighteen carbon atoms. The respective alkenyl groups can be identical or different species. These unsaturated acetals can also be designated at 3,9-dialkenyl-2,4,8,10-tetraoxaspiro (5.5)-undecane. A particularly useful group of these unsaturated acetal compounds are those derived from the reaction of acrolein and substituted acrolein with pentaerythritol. Such unsaturated acetals may be represented by the formula:

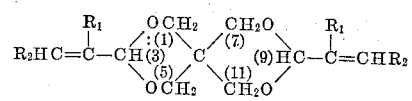

wherein $R_1$ is hydrogen, methyl or chlorine, and $R_2$ is hydrogen or methyl.

Unsaturated acetals which correspond to the formula include:

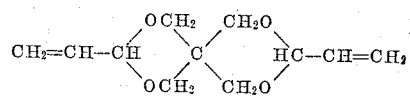

3,9-divinylspirobi(meta-dioxane)

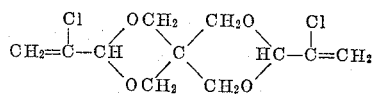

3,9-di(1-chlorovinyl)spirobi(meta-dioxane)

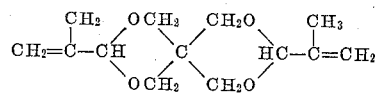

3,9-diisopropenylspirobi(meta-dioxane)

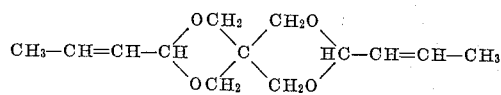

3,9-dipropenylspirobi(meta-dioxane)

Unsaturated spirobi(meta-dioxane) derivatives are readily prepared by the condensation of a mole of pentaerythritol with two moles of an unsaturated aldehyde or ketone, or mixtures thereof, in the presence of an acid catalyst such as p-toluenesulfonic acid. The following reaction schemes are particular illustrations of the general synthetic method. When acrolein is employed, an unsubstituted 3,9 - divinylspirobi(meta-dioxane) is obtained:

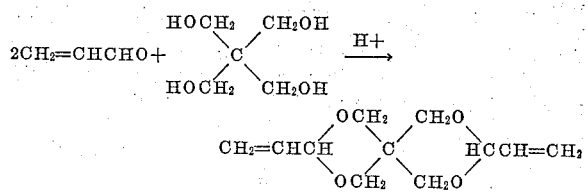

When the condensation is conducted with an unsaturated ketone then the three- and nine-positions of the spiro (meta-dioxane) nucleus obtained have two substituents rather than one:

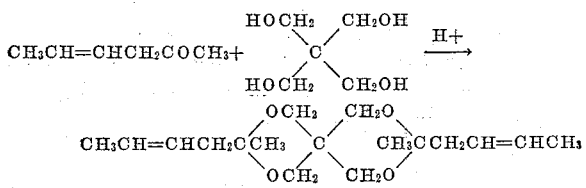

It is not necessary that the unsaturated aldehyde or ketone reacted with pentaerythritol be pure or a single species. Mixtures of unsaturated aldehydes and/or ketones may be condensed with pentaerythritol. The resulting products are mixtures of 3,9-(olefinically-substituted)spirobi(meta-dioxane) compounds which may be resolved into pure components or which may be used as crude mixtures directly in polymerization reactions.

The phenol derivatives which can be employed in the practice of this invention are the compounds of this class which contain at least two positions ortho or para to a phenolic hydroxyl group on an aromatic hydrocarbon nucleus which are susceptible to substitution reactions, e.g., compounds having positions ortho and para to a phenolic hydroxyl group which contain an active hydrogen substituent that can be displaced by an electrophilic reagent. The phenols contemplated include mononuclear phenols such as phenol, chlorophenol, resorcinol, p-phenylphenol, phloroglucinol, hydroquinone, cresol, m-xylenol, beta-naphthol, mixtures of phenols from coal tar or coal hydrogenation fractions, and the like; dinuclear phenols such as 2,2-bis(p-hydroxyphenyl)propane, bis(p-hydroxyphenyl)methane and isomeric diphenylol methanes disclosed in Bender et al., United States Patent No. 2,744,882, and the diphenols disclosed in Bender et al., United States Patent No. 2,506,486, and the like; trinuclear phenols such as 1,1,3-tris(hydroxyphenyl)propane, 1,1,3-tris(hydroxytolyl)propane, 1,1,3-tris(hydroxyphenyl)propene-2, 1,1,3 - tris(hydroxyphenyl)-2-methylpropane, and the like; and other higher polynuclear phenols. The term "mononuclear phenol," "dinuclear phenol," etc., designate the number of aromatic hydrocarbon nuclei in a compound containing at least one phenolic hydroxyl group. For example, by "mononuclear phenol" is meant a compound having one aromatic hydrocarbon nucleus which contains one or more phenolic hydroxy groups, such as cresol and resorcinol. The expression "a phenol" as used hereinafter is meant to include all phenol derivatives within the scope of the foregoing definition.

The reaction for producing flame-resistant spirobi(meta-dioxane) polymers can be conducted simply by heating a mixture of 3,9-dialkenylspirobi(meta-dioxane), a phenol and pentaerythritol phosphorous acid ester at a temperature between about 60° C. and 150° C. The polymerization may require a reaction period of twenty-four hours or longer at the lower reaction temperature, and a reaction period as short as five minutes may be satisfactory to complete the curing of the polymer product at the higher temperatures. Reaction temperatures lower than 60° C. or higher than 150° C. can be employed in particular cases if desired.

The relative concentrations of the reactants can be varied over a wide range in producing the flame-resistant resins. For example, phenol has three reactive ortho and para positions (trifunctional) and 3,9-dialkenylspirobi (meta-dioxane) has two double bonds (difunctional) so that the theoretical combining ratio is one and one-half moles of 3,9-dialkenylspirobi(meta-dioxane) for every mole of phenol. Resins with desirable properties can be produced over a range of between one mole and three moles of 3,9-dialkenylspirobi(meta-dioxane) for every mole of phenol. Generally, it is practical to use not less than one and one-half moles of 3,9-dialkenylspirobi(meta-dioxane) for each mole of phenol reacted. Preferably, a quantity of 3,9-dialkenylspirobi(meta-dioxane) is employed which is equivalent to the functionality of both the phenol and the pentaerythritol phosphorous acid ester. As mentioned previously, the pentaerythritol phosphorous acid ester has free hydroxyl groups which react with olefinic groups during the polymerization reaction.

The pentaerythritol phosphorous acid ester is incorporated into the resin in an amount which is between about 4 percent and 30 percent of the weight of reactants, i.e., the total weight of 3,9-dialkenylspirobi(meta-dioxane), phenol derivative and pentaerythritol phosphorous acid ester. Quantities less than about 4 percent by weight can be incorporated into the compositions but it has been found in many cases that the resins containing these lesser quantities of pentaerythritol phosphorous acid ester support combustion and are not self-extinguishing. Similarly, quantities of pentaerythritol phosphorous acid ester in excess of about 30 percent by weight of the total weight of reactants can be employed if desired. However, such larger quantities of pentaerythritol phosphorous acid ester do not appreciably increase the flame-resistance of the resins and they may deleteriously affect other characteristics of the resins.

The pentaerythritol phosphorous acid ester is sufficiently acidic to promote the formation of resins from the reaction mixtures. However, it is more convenient to conduct the polymerization reactions in the presence of an acidic curing catalyst to increase the rate and efficiency of the reaction. Satisfactory curing catalysts include acidic catalysts such as hydrochloric acid, sulfuric acid, toluenesulfonic acid, benzenesulfonic acid, boron-trifluoride, aluminum chloride, stannic chloride, titanium tetrachloride, phenyl acid phosphate, octylphenyl acid phosphate, and the like. Curing catalyst concentrations can vary from as little as 0.1 weight percent for the more active catalysts, up to 1.0 weight percent or more for the less active catalysts, based on the total weight of reactants.

In another method found convenient for preparing flame-resistant polymers, 3,9-dialkenylspirobi(meta-dioxane) and a phenol are reacted together in suitable proportions to produce a liquid pre-condensate A-stage resin in the presence of an acid catalyst. The pre-condensate polymerization reaction is conducted at a temperature between about 100° C. and 150° C. for a period of time between one-half hour and five hours depending on the viscosity desired for the A-stage resin. After volatile materials have been removed by distillation, the A-stage resin is usually a viscous liquid which slowly condensed to a solid plastic on standing. For practical purposes, the condensation can be stopped by neutralization or removal of the catalyst. The neutral A-stage resin can be stored until needed.

Flame-resistant polymers are prepared from the A-stage resin by admixing a calculated quantity of pentaerythritol phosphorous acid ester with said resin and heating the mixture until complete curing is obtained. A curing catalyst is also added to the mixture prior to the polymerization reaction unless the catalyst employed for preparing the pre-condensate A-stage resin is still present in the mixture in a sufficient quantity to promote the formation of a cured flame-resistant resinous product. This final cure can be accomplished at the same temperature employed for the formation of the intermediate A-stage resin, or at higher temperatures such as between 100° C. and 150° C.

The flame-resistant spirobi(meta-dioxane) polymers of this invention can be employed to produce molded articles, laminates, or any product for which other thermosetting resins are used. They can be cured in any desirable shape or form. These polymers have the advantage of being self-extinguishing when ignited, besides being strong, tough and rigid.

These flame-resistant polymers also have the advantage over many other thermoset resins in that they cure without the formation of volatile by-products, such as water, and there is little or no shrinkage during the curing process.

The following examples will serve to illustrate specific embodiments of this invention. The first three examples demonstrate the flammability of spirobi(meta-dioxane) phenolic resins which do not contain polymer-bound phosphorous.

*Example 1*

A charge of 3,9-divinylspirobi(meta-dioxane) (405 grams), phenol (120 grams) and diethyl sulfate (1.6 grams) was placed in a reaction flask and heated for a period of fifty minutes at a temperature of 100° C. to 120° C. At the conclusion of this period, the liquid resin was poured into molds and cured for sixteen hours at a temperature of 150° C. The cured polymer was a dark, hard material with the following properties:

Heat distortion, ° C_____ 149
Hardness, Durometer "D"_____ 81
Impact strength (Izod), ft. lbs./in. of notch_____ 0.75

A thin bar (5" x ½" x ⅛") of this material was tested for flammability according to ASTM–D635–44 and it burned for twenty-three minutes before the flame extinguished.

*Example 2*

A mixture of 3,9-divinylspirobi(meta-dioxane) (318 grams) and 1,1,3-tris(hydroxyphenyl)propane (160 grams) was heated at a temperature of 100° C. until it was homogeneous. It was then cooled to a temperature of 53° C. and treated with mixed alkanesulfonic acid (0.717 gram). The liquid pre-condensate was then poured into molds and cured for six hours at a temperature of 150° C. The resulting polymer was hard, smooth, and glossy, and had the following properties:

Heat distortion, ° C_____ 192
Impact strength (Izod), ft. lbs./in. of notch_____ 0.4

A thin bar (5" x ½" x ⅛") of the material was tested for flammability according to ASTM–D635–44 and burned for fourteen minutes before extinguishing.

*Example 3*

A mixture of 3,9-divinylspirobi(meta-dioxane) (51 grams), 2,2-(p-hydroxyphenyl)propane (27.6 grams), and 0.511 gram of diethyl sulfate was heated in a reaction flask for ten minutes at a temperature of 100° C. to 110° C. The material was then poured into molds and cured for twenty hours at a temperature of 100° C. A thin bar (5" x ½" x ⅛") of the resulting hard, glossy polymer was completely consumed when tested for flammability according to the standard method.

*Example 4*

A charge of phosphorous trichloride (548 grams, 4 moles) and pentaerythritol (136 grams, 1 mole) was placed in a distillation flask and refluxed for a period of three hours. Hydrogen chloride evolved during the reaction and was collected in a cold trap. Components of the reaction mixture which were volatile at a temperature of 150° C. under a pressure of 2 millimeters of mercury were distilled off and combined with the material collected previously in a cold trap. The combined fractions were redistilled and approximately 4 moles of hydrogen chloride and 2 moles of unreacted phosphorous trichloride were recovered.

To the material in the reaction flask, 1000 milliliters of water were added at a slow rate while the temperature was maintained at 110° C. to 125° C., and water and hydrochloric acid were continuously removed as distillate. At the conclusion of this operation, components of the reaction mixture were removed which were volatile at a temperature of 150° C. under a pressure of 3 millimeters of mercury. A light-colored, viscous liquid product (254 grams) was recovered from the reaction flask which contained 23.3 percent phosphorus and 0.6 percent chlorine. The molecular weight was 182 by ebullioscopic determination and the equivalent weight was 69 by hydroxyl analysis.

*Example 5*

A charge of 3,9-divinylspirobi(meta-dioxane) (122.5 grams), phenol (31 grams), and 23 grams of the phosphorous acid ester material prepared in Example 4 was placed in a reaction flask. The phosphorous acid ester material was 13 percent by weight of the total mixture. After being heated for fifteen minutes at a temperature of 125° C., the mixture was poured into molds and cured for sixteen hours at a temperature of 150° C. The resulting polymer had the following properties:

Heat distortion, ° C_____ 124
Hardness, Durometer "D"_____ 86
Impact strength (Izod), ft. lbs./in. of notch_____ 0.4

A thin bar (5" x ½" x ⅛") of the material was tested for flammability according to ASTM–D635–44 and it was self-extinguishing within three seconds after being ignited. When the test was repeated the flame persisted for only five seconds.

*Example 6*

A charge of 3,9-divinylspirobi(meta-dioxane) (79.5 grams), phenol (23.5 grams) and 5.15 grams of phosphorous acid ester material prepared in the same manner as described in Example 4 was placed in a reaction flask. The phosphorous acid ester material was 4.8 percent by weight of the total reaction mixture. After being heated for ten minutes at a temperature of 125° C., the mixture was poured into molds and cured for sixteen hours at a temperature of 150° C. The cured polymer was a smooth, hard, light yellow solid which was self-extinguishing in five seconds when a thin bar (5" x ½" x ⅛") was tested for flammability according to ASTM–D635–44.

*Example 7*

A charge of 3,9-divinylspirobi(meta-dioxane) (104 grams), 1,1,3-tris(hydroxyphenyl)propane (36 grams) and 21 grams of phosphorous acid ester material prepared in the same manner as described in Example 4 (13 percent by weight of the total mixture) was placed in a reaction flask. The mixture was heated for ten minutes at a temperature of 100° C. to 110° C. and then poured into molds and cured for sixteen hours at a temperature of 150° C. The resulting hard, smooth polymer had the following properties:

Heat distortion, ° C_____ 183
Hardness, Durometer "D"_____ 89
Impact strength (Izod), ft. lbs./in. of notch_____ 0.2

A thin bar (5" x ½" x ⅛") of the material was tested for flammability according to ASTM–D635–44 and was self-extinguishing within ten seconds after being ignited.

*Example 8*

A charge of 3,9-divinylspirobi(meta-dioxane) (71 grams), 1,1,3-tris(hydroxyphenyl)propane (36 grams) and 10.7 grams of phosphorous acid ester material prepared in the same manner as described in Example 4 (9.1 percent by weight of the total charge) was placed in a reaction flask and heated to a temperature of 125° C. The mixture was then poured into molds and cured for sixteen hours at a temperature of 150° C. The resulting hard, smooth polymer was self-extinguishing within sixteen seconds when tested for flammability according to the standard test method. When tested a second time it was self-extinguishing within six seconds.

*Example 9*

A mixture of 3,9-divinylspirobi(meta-dioxane) (71 grams), 1,1,3-tris(hydroxyphenyl)propane (36 grams), and 5.35 grams of phosphorous acid ester material prepared in the same manner as described in Example 4

(4.8 weight percent based on the total charge) was placed in a reaction flask and heated to a temperature of 100° C. The molten mixture was then poured into molds and cured for sixteen hours at a temperature of 150° C. The resulting hard, smooth polymer had the following properties:

Heat distortion, ° C _____ 157
Hardness, Durometer "D" _____ 88
Impact strength (Izod), ft. lbs./in. of notch _____ 0.3

When tested for flammability by the standard method, a thin bar (5" x ½" x ⅛") of the material burned for sixty-five seconds after it was ignited, and it was self-extinguishing within three minutes when it was tested a second time.

*Example 10*

A mixture of 3,9-divinylspirobi(meta-dioxane) (51 grams), 2,2-(p-hydroxyphenyl)propane (27.6 grams), diethyl sulfate (0.532 gram), and 4.47 grams of phosphorous acid ester material prepared in the same manner as described in Example 4 (5.3 weight percent based on the total charge) was heated in a reaction flask to form a homogeneous mixture. After heating for seven minutes at a temperature of 110° C., the molten mixture was poured into molds and cured for eighteen hours at a temperature of 150° C. The resulting hard, glossy polymer was self-extinguishing within sixty seconds when tested for flammability according to the standard method.

*Example 11*

A mixture of 3,9-divinylspirobi(meta-dioxane) (51 grams), 2,2-(p-hydroxyphenyl)propane (27.6 grams), diethyl sulfate (0.56 gram), and 8.85 grams of phosphorous acid ester material prepared in the same manner as described in Example 4 (10 percent by weight of the total charge) was heated for five minutes at a temperature of 110° C. The molten mixture was then poured into molds and cured for seventeen hours at a temperature of 100° C. A thin bar of the material was self-extinguishing within twenty-five seconds when tested for flammability by the standard method.

What is claimed is:

1. A curable composition comprising 3,9-dialkenylspirobi(meta-dioxane) having between two and eighteen carbon atoms in each alkenyl radical, phenol and between about 4 percent and 30 percent by weight, based on the total composition weight, of phosphorous acid ester material comprising substantially:

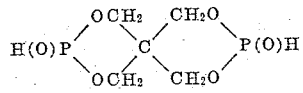

2. A curable composition comprising 3,9-dialkenylspirobi(meta-dioxane) having between two and eighteen carbon atoms in each alkenyl radical, 1,1,3-tris(hydroxyphenyl)propane and between about 4 percent and 30 percent by weight, based on the total composition weight, of phosphorous acid ester material comprising substantially:

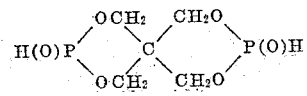

3. A curable composition comprising 3,9-dialkenylspirobi(meta-dioxane) having between two and eighteen carbon atoms in each alkenyl radical, 2,2-(p-hydroxyphenyl)propane and between about 4 percent and 30 percent by weight, based on the total composition weight, of phosphorous acid ester material comprising substantially:

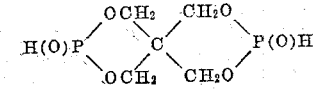

4. A curable composition comprising 3,9-dipropenylspirobi(meta-dioxane), phenol and between about 4 percent and 30 percent by weight, based on the total composition weight, of phosphorous acid ester material comprising substantially:

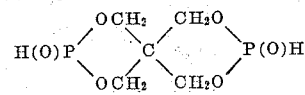

5. A curable composition comprising 3,9-diisopropenylspirobi(meta-dioxane), phenol and between about 4 percent and 30 percent by weight, based on the total composition weight, of phosphorous acid ester material comprising substantially:

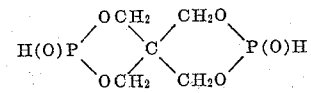

6. A curable composition comprising 3,9-di(1-chlorovinyl)spirobi(meta-dioxane), phenol and between about 4 percent and 30 percent by weight, based on the total composition weight, of phosphorous acid ester material comprising substantially:

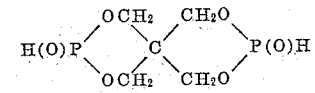

7. A curable composition comprising 3,9-divinylspirobi(meta-dioxane), phenol and between about 4 weight percent and 30 weight percent, based on the total composition weight, of phosphorous acid ester material comprising substantially:

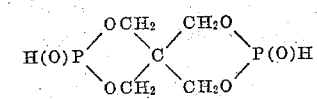

8. A process for preparing resins which comprises heating at reaction temperature 3,9-dialkenylspirobi(meta-dioxane) having between two and eighteen carbon atoms in each alkenyl radical, a phenol having at least two hydrogen atoms ortho-para to a phenolic hydroxyl group and between about 4 percent and 30 percent by weight, based on the total composition weight, of phosphorous acid ester material comprising substantially:

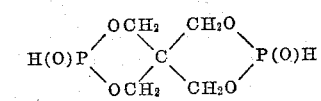

9. A process for preparing flame-resistant resins which comprises heating at reaction temperature in the presence of an acidic catalyst 3,9-divinylspirobi(meta-dioxane), phenol and between about 4 percent and 30 percent by weight, based on the total composition weight, of phosphorous acid ester material comprising substantially:

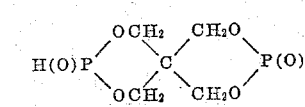

10. The process of claim 9 wherein said acidic catalyst is dialkyl sulfate.

11. The process of claim 10 wherein said dialkyl sulfate is diethyl sulfate.

12. A process for preparing resins which comprises heating at a temperature between 100° C. and 150° C. a phenol having at least two hydrogen atoms ortho-para to a phenolic hydroxyl group with 3,9-dialkenylspirobi(meta-dioxane) having between two and eighteen carbon atoms in each alkenyl radical in the presence of an acidic catalyst to form a partially cured mixture, and heating at a temperature between 100° C. and 150° C. said partially cured mixture with between about 4 percent and 30 percent by weight, based on the total composition weight, of phosphorous acid ester material comprising substantially:

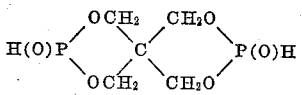

13. A process for preparing polymers which comprises heating at a temperature between 100° C. and 150° C. a partially cured mixture of phenol and 3,9-divinylspirobi-(meta-dioxane) with between about 4 percent and 30 percent by weight, based on the total composition weight, of phosphorous acid ester material comprising substantially:

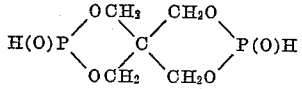

in the presence of an acidic catalyst to form a solid, flame-resistant resin.

14. A curable composition comprising 3,9-dialkenyl-spirobi(meta-dioxane) having between two and eighteen carbon atoms in each alkenyl radical, a phenol having at least two hydrogen atoms ortho-para to a phenolic hydroxyl group, and between about 4 percent and 30 percent by weight, based on the total composition weight, of phosphorous acid ester material comprising substantially:

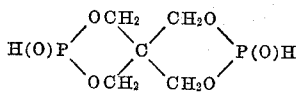

15. The composition of claim 14 cured at a temperature between 60° C. and 150° C.

16. The resins produced by the process of claim 13.

References Cited in the file of this patent
UNITED STATES PATENTS

| | | |
|---|---|---|
| 2,401,776 | Rothrock | June 11, 1946 |
| 2,915,499 | Wilson et al. | Dec. 1, 1959 |

FOREIGN PATENTS

| | | |
|---|---|---|
| 588,833 | Great Britain | June 4, 1947 |

UNITED STATES PATENT OFFICE
CERTIFICATE OF CORRECTION

Patent No. 3,012,988                          December 12, 1961

Howard R. Guest et al.

It is hereby certified that error appears in the above numbered patent requiring correction and that the said Letters Patent should read as corrected below.

Column 2, line 13, for "at" read -- as --; column 2, lines 41 to 44, the formula should appear as shown below instead of as in the patent:

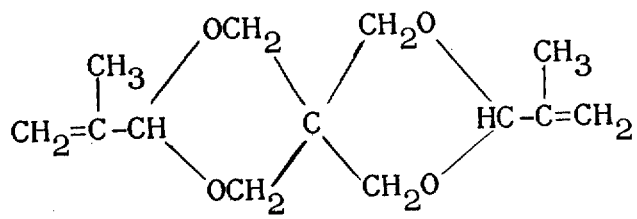

line 72, for "spiro" read -- spirobi --; column 4, line 30, for "a" read -- as --.

Signed and sealed this 8th day of May 1962.

(SEAL)
Attest:

ERNEST W. SWIDER
Attesting Officer

DAVID L. LADD
Commissioner of Patents